United States Patent

Ikarashi et al.

[11] Patent Number: 6,042,938
[45] Date of Patent: Mar. 28, 2000

[54] MAGNETIC RECORDING MEDIUM

[75] Inventors: Tsunehiko Ikarashi; Masahide Kohno; Shinji Miyazaki, all of Nagano, Japan

[73] Assignee: TDK Corporation, Tokyo, Japan

[21] Appl. No.: 08/992,088

[22] Filed: Dec. 17, 1997

[30] Foreign Application Priority Data

Dec. 18, 1996 [JP] Japan .................... 8-354188

[51] Int. Cl.⁷ .................................................. G11B 5/68
[52] U.S. Cl. .............. 428/323; 428/425.9; 428/694 BB; 428/900
[58] Field of Search ................ 428/323, 425.9, 428/694 BB, 900

[56] References Cited

U.S. PATENT DOCUMENTS

| | | | |
|---|---|---|---|
| 5,238,753 | 8/1993 | Ryoke et al. | 428/694 BY |
| 5,374,478 | 12/1994 | Hitomi et al. | 428/323 |
| 5,443,913 | 8/1995 | Kohno et al. | 428/425.9 |
| 5,698,286 | 12/1997 | Ikarashi et al. | 428/65.3 |

FOREIGN PATENT DOCUMENTS

| | | |
|---|---|---|
| 0 647 937 | 4/1995 | European Pat. Off. . |
| 52-17401 | 5/1977 | Japan . |
| 58-200426 | 11/1983 | Japan . |
| 59-2228 | 1/1984 | Japan . |
| 63-144416 | 6/1988 | Japan . |
| 2-42624 | 2/1990 | Japan . |
| 2-42625 | 2/1990 | Japan . |
| 2-134720 | 5/1990 | Japan . |
| 2-141925 | 5/1990 | Japan . |
| 2-49490 | 10/1990 | Japan . |
| 4-81261 | 12/1992 | Japan . |
| 5-72647 | 10/1993 | Japan . |
| 7-9692 | 2/1995 | Japan . |

*Primary Examiner*—Stevan A. Resan
*Attorney, Agent, or Firm*—Oblon, Spivak, McClelland, Maier & Neustadt, P.C.

[57] ABSTRACT

A magnetic recording medium includes a non-magnetic supporting substrate, and a magnetic layer on one surface thereof and a back coat layer on the other surface thereof, said back coat layer having a non-magnetic powder dispersed in a binder. The back coat layer contains carbon black and an inorganic powder as said non-magnetic powder. The carbon black contains a carbon black species having an average primary particle diameter of 40 to 70 nm, and the inorganic powder has an average primary particle diameter of 40 to 150 nm and a Mohs hardness of at least 3, with a weight ratio between said carbon black and said inorganic powder being 100:0.5 to 100:10. The binder comprises a phenoxy resin, a thermoplastic polyurethane resin having an amino group in a molecule thereof, and a polyisocyanate compound.

4 Claims, No Drawings

MAGNETIC RECORDING MEDIUM

BACKGROUND OF THE INVENTION

The present invention relates to a magnetic recording medium having a magnetic layer on one surface of a non-magnetic supporting substrate and a back coat layer on the other surface thereof, in which non-magnetic powders are dispersed in a binder.

So far, magnetic recording media of the so-called coated type have been widely used as magnetic recording media. A coated type magnetic recording medium is typically fabricated by coating a supporting substrate with a magnetic coating material in which ferromagnetic oxide powders of $\gamma$-$Fe_2O_3$ or $\gamma$-$Fe_2O_3$ containing cobalt, or a magnetic powder material such as alloy magnetic powders composed mainly of iron, cobalt and nickel is dispersed in an organic binder such as a vinyl chloride-vinyl acetate copolymer, polyester resin, and polyurethane resin, followed by drying.

To meet steadily increasing demands for ever-higher recording density and size reductions, magnetic recording media are now required to have ever-higher smooth and ever-thinner structures. In the coated type media, especially in media using alloy magnetic powders, therefore, making magnetic layers very smooth and thin is under investigation.

Apart from this, a magnetic recording medium of the so-called ferromagnetic metal thin film type has been proposed, in which a cobalt, iron, or Co—Ni alloy base ferromagnetic metal material is directly deposited on a nonmagnetic supporting substrate by vacuum thin film technologies such as vacuum evaporation and a lubricating agent layer is provided on the ferromagnetic metal material. This magnetic recording medium is mainly put to practical use as a magnetic recording medium for commercial video cameras.

This ferromagnetic metal thin film type of magnetic recording medium is a very advantageous medium in view of electromagnetic characteristics because the packing density of the magnetic material can be increased for reason of no need of incorporating a non-magnetic organic binder into the magnetic layer, and the thickness of the magnetic layer can be much more reduced, so that demagnetization upon recording and thickness loss can be much more reduced than ever before.

However, the recording medium having a ferromagnetic metal thin film merely deposited on a nonmagnetic supporting substrate together with a lubricating agent layer has problems regarding reliability such as still durability, and the weather resistance of a magnetic layer.

To provide a drastic solution to these problems, the use of a protective layer is under investigation. In particular, a magnetic recording medium provided with a hard carbon film by plasma polymerization has been put forward, and is row practically used as a magnetic recording medium for commercial digital VTRs.

To make sure of the running performance of these high-density recording media in decks, they are generally provided with a back coat layer irrespective of whether they are of the coated type or the metal thin film type, and irrespective of whether or not the metal thin film media are provided with a protective film.

The back coat layer is first required to make sure of the running performance of the recording medium in a deck. For data storage, however, special care must be taken to maintain the initial performance even after long-term storage or storage at high temperature and humidity. During storage, the back coat layer comes into direct contact with the magnetic layer on the other surface of the supporting substrate or is in opposition thereto though the protective film or lubricating layer. Therefore, when the back coat layer has too coarse a surface shape, the surface shape is transferred onto the magnetic layer, not only resulting in an increased drop-out but making error rates worse as well. In some cases or although depending on the material of which the back coat layer is formed, the back coat layer may stick to the magnetic layer or may launch a corrosive attack on the magnetic layer. Referring here to a magnetic layer of a high-density recording medium in particular, there is now no choice but to mirror-finish the magnetic layer, and the magnetic layer is often designed such as to match the coated type medium or the metal thin film type, both using alloy magnetic powders. To meet the aforesaid storability, therefore, it is required to satisfy ever-severer demands for the back coat.

In general, such a back coat layer has a structure wherein non-magnetic powders are dispersed in a binder. In many cases, especially carbon black is dispersed as a main component in the binder optionally with the addition thereto of other carbon black species or various pigments or various additives. The reasons for using carbon blacks for the back coat layer are to lower the surface electric resistance of the back coat layer thereby preventing deposition of dust by static electricity, impart a light-blocking property to the back coat layer thereby preventing malfunction, and improve running durability.

One example of using carbon black as non-magnetic powders is disclosed in JP-B 52-17401. The objectives of this example are to make use of the conductivity of carbon black thereby achieving antistatic and light-blocking effects, and make use of the agglomeration of carbon particles thereby making the surface of a back coat layer rough. However, this carbon black can hardly be prepared in a coating material form and so is prone to agglomeration because its average particle diameter ranges from 10 to 20 nm. An agglomeration of carbon black particles, in turn, gives asperities on the magnetic layer. Since carbon black having a small particle diameter is poor in dispersibility, it is difficult to allow the carbon black to have such an average roughness as to prevent the formation of the aforesaid asperities. The reason why it is difficult to disperse carbon black having too small an average particle diameter appears to be that such carbon black tends to have a secondary structure.

JP-A 63-144416 shows an example of using carbon black having a large particle diameter. The carbon black used therein is of the thermal type having a particle diameter of 60 to 200 nm. This structure-free type carbon black can be uniformly dispersed in a binder and has some striking effect on lowering the coefficient of friction. However, this carbon black is not suitable for a back coat of a high-density recording medium because the size of carbon black particles upon uniform dispersion still imposes limitations on reducing the formation of asperities.

JP-B 2-49490 shows an example of using a plurality of carbon black species. A main objective of this example is to improve wear resistance. Carbon black having a particle diameter of 10 to 35 nm is used in combination with carbon black having a particle diameter of 40 to 150 nm. JP-B 4-81261 makes investigations on the combined use of fine carbon black having an average particle size of 30 to 100 nm and coarse carbon black having an average particle size of 150 to 500 nm. Even when carbon black species are used together while only the particle diameter difference is taken into account, however, it is difficult to arrive at a reasonable compromise between the running performance and storability of a high-density recording medium.

As one specific example, JP-B 2-49490 refers to the combined use of 70% by weight of carbon black having a particle diameter of 26 nm and 30% by weight of carbon black having a particle diameter of 64 nm. In this example, however, there is a large particle diameter difference between both the carbon black species. Thus, the carbon black having a larger particle diameter appears as a multiplicity of soike protuberances on the back coat surface formed by the carbon black having a smaller particle diameter, offering a problem regarding transfer of the back coat surface onto the associated magnetic layer. On the other hand, JP-B 4-81251 refers as one specific example to the combined use of fine carbon black -having an average particle size of 50 nm and coarse carbon black having an average particle size of 150 nm. However, the particle diameter of the coarse carbon black is too large and so there is a large particle diameter difference between the fine particles and the coarse particles. In this case, too, a problem arises regarding transfer of the back coat surface onto the associated magnetic layer due to the formation of spiky protuberances.

In many attempts made so far in the art, carbon black is used as non-magnetic powders along with other inorganic pigment. For instance, JP-B 5-72647 makes investigations on the addition of carbon black and an inorganic pigment having a Mohs hardness of up to 6, e.g., $CaCO_3$, $BaSO_4$ or $Fe_2O_3$ for the purpose of reducing a wear on the back coat surface. Since a vinyl chloride copolymer or cellulosic resin is used as the binder, however, it is not preferable to use this non-magnetic powder system as a back coat of a coated type medium or a metal thin film type medium, both using alloy magnetic powders, because a problem arises upon storage at high temperature and humidity.

In some attempts so far made in the art, species of carbon are used in combination with other inorganic pigments. JP-A's 2-42624, 2-42625, 2-134720 and 2-141925 disclose the combined use of carbon black having an average primary particle diameter of 20 to 40 nm, carbon black having an average primary particle diameter of 50 to 100 nm, and other inorganic pigment. In all these attempts, however, cellulosic resins are used as the binders. It is again not preferable to use such systems as a back coat of the coated type medium or the metal thin film type medium, both using alloy magnetic powders, because a problem arises upon storage at high temperature and humidity. This inorganic pigment is provided to give a moderate surface roughness to the back coat surface, and so has an average particle diameter of 300 to 1,500 nm that poses a problem regarding transfer of the back coat surface onto the associated magnetic layer.

Binders-excellent in terms of the dispersibility of non-magnetic powders therein, adhesion thereof to non-magnetic supporting substrates, and the wear resistance of coated films are now used. For instance, one or at least two resins of thermoplastic resins such as polyurethane resin, polyester resin, cellulosic resin, vinyl chloride copolymer resin and phenoxy resin are used in combination with a polyisocyanate compound to obtain a heat curable type binder, and in combination with a resin having an unsaturated double bond sensitive to radiation to obtain a radiation curable type binder.

However, the vinyl chloride copolymer resin and cellulosic resin, both tending to incur the risk of giving off corrosive gases, are not preferable for a binder for the back coat of the coated type medium or metal thin film type medium, both using alloy magnetic powders.

A binder containing neither a vinyl chloride copolymer resin nor a cellulosic resin is disclosed in JP-A 58-200426 as well as in JP-A 59-2228. The binder is made up of phenoxy resin, thermoplastic polyurethane elastomer and polyisocyanate. However, this binder system has a primary effect on the initial running durability, and the publications say nothing about whether or not it has an effect on storability. The publications make no particular reference to the dispersibility of the polyurethane elastomer used, and the polyurethane elastomer exemplified has no polar group. A binder comprising a combination of this type of polyurethane elastomer with phenoxy resin is found to be insufficient in terms of the dispersion of inorganic powders. The filler used is an inorganic powder such as $CaCO_3$ powder or carbon black. The publications teach the sole use of these materials, but fail to give any suggestion as to using a mixture of two or more materials. It is thus difficult to arrive at a sensible tradeoff between the prevention of deposition of dust by static electricity that is achieved by making sure of conductivity thereby lowering the surface electric resistance and the wear resistance of the back coat surface. In this connection, it is noted that while many proposals have been made as to techniques for introducing polar groups in the polyurethane elastomer, nothing is still proposed to improve the dispersibility of carbon black in a mixture system of polyurethane elastomer and phenoxy resin.

It is noted that JP-B 1-91317 and JP-A' 6-325353, 7-169040 and 8-17037 disclose an amine-containing polyurethane. However, these publications fail to disclose the particle diameter of carbon black, and provide no disclosure about the combined use of carbon black and phenoxy resin or inorganic pigment.

SUMMARY OF THE INVENTION

An object of the invention is to provide a back coat having improved running performance, and a particular object of the invention is to provide a magnetic recording medium having a back coat layer which does not only have reduced running friction and improved wear resistance, but maintains the initial level of running performance even after long-term storage or storage at high temperature and humidity, causes no corrosive or other damage to a magnetic layer, and suffers no or little deterioration of the initial drop-out level and error rate.

Such objects are achievable by the present invention, as set forth in the following (1) through (4).

(1) A magnetic recording medium including a non-magnetic supporting substrate, and a magnetic layer on one surface thereof and a back coat layer on the other surface thereof, said back coat layer having a non-magnetic powder dispersed in a binder, wherein:

said back coat layer contains carbon black and an inorganic powder as said non-magnetic powder, said carbon black contains a carbon black species having an average primary particle diameter of 40 to 70 nm, said inorganic powder has an average primary particle diameter of 40 to 150 nm and a Mohs hardness of at least 3, a weight ratio between said carbon black and said inorganic powder is 100:0.5 to 100:10, and said binder comprises a phenoxy resin, a thermoplastic polyurethane resin having an amino group in a molecule thereof, and a polyisocyanate compound.

(2) The magnetic recording medium of (1), wherein said carbon black species having an average primary particle diameter of 40 to 70 nm accounts for 80 to 100% by weight of said carbon black contained in said back coat layer.

(3) The magnetic recording medium of (1) or (2), wherein said back coat layer contains a carbon black species having an average primary particle diameter of greater than 70 nm but equal to or smaller than 100 nm in addition to said carbon black species.

(4) The magnetic recording medium of any one of (1) to (3), wherein said inorganic powder has a Vohs hardness of 3 to 6.

DETAILED DESCRIPTION OF EMBODIMENTS OF THE INVENTION

The magnetic recording medium of the invention comprises a non-magnetic supporting substrate, a magnetic layer provided on one surface of the supporting substrate, and a back coat layer provided on the other surface of the supporting substrate, said back coat layer comprising at least one carbon black, an inorganic powder and a binder. The carbon black has an average primary particle diameter between 40 nm and 70 nm. The inorganic powder has an average primary particle diameter of 40 to 150 nm, and a Mohs hardness of at least 3, preferably 3 to 6. Referring to the weight ratio of the inorganic powder to the carbon black, the carbon black-to-inorganic powder ratio is between 100:0.5 and 100:10. The binder comprises a phenoxy resin, a thermoplastic polyurethane having an amino group in its molecule, and a polyisocyanate compound.

The main carbon black used herein has an average primary particle diameter between 40 nm and 70 nm. The carbon black has a BET specific surface area lying in a preferable range of 20 to 70 $m^2/g$, an $I_2$ absorption lying in a preferable range of 20 to 60 g/Kg, and a DBP oil absorption lying in a preferable range of 40 to 160 ml/100 g.

Example& of such carbon black are Special Black 250 and Special Black 100 made by Degusa Co., Ltd., MA 220 made by Mitsubishi Chemical Industries, Ltd., Raven 500 made by Colombian Chemicals Company, and #60 and #55 made by Asahii Carbon Co., Ltd. The use of carbon black having an average primary particle diameter in the range of 40 nm to 70 nm can arrive at a sensible tradeoff between surface roughness and running friction.

However, carbon black having an average primary particle diameter of the order of 10 nm to 20 nm has often a bulky structure, and is difficult to disperse, making the surface of the back coat layer rough and so offering a problem regarding transfer of the back coat surface. Carbon black having an average primary particle diameter of the order of 20 nm to less than 40 nm is possible to disperse if its specific surface area is about 250 $m^2/g$ or less, but has a grave disadvantage of making the initial running friction large. Examples of such carbon black are Conductex SC and Raven 1060 made by Colombian Chemicals Company, and #1000 and MA8 made by Mitsubishi Chemical Industries, Ltd.

When the particle diameter of carbon black is greater than 70 nm, carbon black particles themselves form a rough surface, although they are uniformly dispersed without having a secondary structure. Consequently, a problem arises regarding transfer of the back coat surface. Examples of such carbon black are Asahi Thermal and #50 made by Asahi Carbon Co., Ltd., #5 and #10 made by Mitsubishi Chemical Industries, Ltd., and Raven 410, Raven 420, Raven 430 and Raven 450, all made by Colombian Chemicals Company.

By the sole use of carbon black having an average primary particle diameter of 40 to 70 nm as the carbon black, therefore, it is possible to achieve a sensible tradeoff between surface roughness and running friction. Two or more species of carbon blacks having such an average primary particle diameter may be used. While carbon black having an average primary particle diameter of 40 to 70 nm may be used in combination with other carbon black, it is then preferable that all the carbon blacks incorporated in the back coat layer contain at least 80% by weight of carbon black having an average primary particle diameter of 40 to 70 nm. In such a case, it is noted that the use of carbon black having an average primary particle diameter of 40 to 70 nm in combination with carbon black having an average primary particle diameter of less than 40 rum or greater than 150 nm as set forth in JP-B 2-49490 or 4-81261 is not appropriate for a back coat material for a high-density magnetic material.

In the practice of the invention, two or more species of carbon blacks may be used; the aforesaid carbon black having an average primary particle diameter of 40 to 70 nm may be used as a main carbon black component in combination with a subordinate carbon black component. The subordinate carbon black used has an average primary particle diameter slightly larger than that of the main carbon black, e.g., greater than 70 nm but equal to or smaller than 100 nm. The subordinate carbon black has a BET specific surface area of preferably 15 to 40 $m^2/g$, an $I_2$ absorption of preferably 15 to 100 g/Kg, and a DBP oil absorption of preferably 40 to 130 ml/100 g. The average primary particle diameter of the subordinate carbon black is preferably at most twice, and especially 1.2 to 1.5 times, as large as that of the main carbon black.

The subordinate carbon black, when added, is effective for the achievement of further running friction reductions, and reducing the deterioration of surface roughness to such a degree that the transfer of the back coat surface onto the magnetic surface remains substantially unchanged. A possible reason is that spiky protuberances are hardly formed due to the fact that there is no distinct difference in the average particle diameter between the two carbon black species. The amount of the subordinate carbon black used may be determined in view of a sensible tradeoff between the running friction of the back coat surface with a deck used and the transfer of the back coat surface, and is preferably 0 to 20% by weight, especially 0 to 15% by weight with respect to the main carbon black. Examples of the carbon black usable together with the main carbon black are Lamp Black 250 made by Degusa Co., Ltd., Raven 420 and Raven 450 made by Colombian Chemicals Company, and #35 and #80 made by Asahi Carbon Co., Ltd.

The particulate shape of the carbon black used herein is not critical to the practice of the invention. However, it is preferable to use a substantially spherical form of thermal carbon black because of substantial lack of structure, and because this thermal carbon black is easily and uniformly dispersed into the binder, resulting in a frictional resistance reduction.

The inorganic powder used herein has a Mohs hardness of at least 3, and preferably 3 to 6. At a Mohs hardness of less than 3, there is a wear resistance drop which may otherwise give rise to an increased wear on the back coat surface. At a Mohs hardness exceeding 6, on the other hand, there is an increased wear on a running path defined by capstans, guides, etc. in the deck used although the degree of wear is dependent on the material of which such parts are made up. This wear leads to a problem that shavings are deposited onto the surface of the magnetic layer.

For the inorganic powder having a Mohs hardness of at least 3, for instance, use may be made of silicon oxide, titanium oxide, aluminum oxide, zinc oxide, calcium carbonate, barium carbonate, barium sulfate, calcium sulfate, zinc sulfate, tin oxide, chromium oxide, silicon carbide, calcium carbide, and α-iron oxide. Especially preferable for the inorganic powder having a Mohs hardness of 3 to 6 are silicon oxide, titanium oxide, zinc oxide, calcium carbonate, barium carbonate, barium sulfate, calcium sulfate, zinc sulfate, tin oxide, and calcium carbide.

Wear resistance is improved by the addition of this inorganic powder. Therefore, the particle diameter and amount of the inorganic powder used herein may be determined in view of a reasonable compromise between the effect on wear resistance and the transfer of the back coat surface onto the magnetic surface due to its surface roughness. It is thus preferable that the inorganic powder has an average particle resistance and the transfer of the back coat surface onto the magnetic surface due to its surface roughness. It is thus preferable that the inorganic powder has an average particle diameter of 40 to 150 nm and is used in an amount of 0.5 to 10% by weight and especially 1 to 8% by weight based on the total amount of the carbon black or carbon blacks often the inorganic powder has a small particle diameter, it is preferably used in a larger amount, and when the inorganic powder has a large particle diameter, it is preferably used in a smaller amount. Too little inorganic powders make it impossible to obtain sufficient wear resistance, whereas too much makes the back coat surface rougher and so renders the transfer of the back coat surface to the magnetic layer worse.

The binder used herein comprises a phenoxy resin, a thermoplastic polyurethane having an amino group in its molecule and a polyisocyanate compound.

The phenoxy resin used herein has preferably the following formula (1):

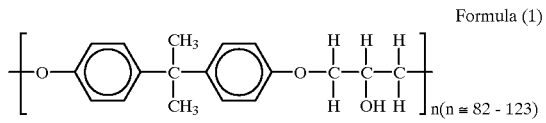

Formula (1)

where n is preferably about 82 to 123.

For instance, use may be made of commercially available products including Phenototo YP-50 made by Toto Kasei Co., Ltd., which is a high-molecular-weight polyhydroxvpolyether that is synthesized from bisphenol A and epichlorohydrin and has a specific gravity (20/20° C.) of 1.17 to 1.19, a glass transition point (measured by DSC) of about 100° C., a number-average molecular weight of about 11,800 and a weight-average molecular weight of about 58,600. Other examples of this phenoxy resin are PAPHEN Phenoxy Resins PKHC, PKFH, and PKHJ made by Phenoxy Associates Co., Ltd. (Tomoe Kogyo Co., Ltd.). PKHC, PKHH and PKHJ are represented by formula (1) where n is 82, 83, 84 . . . , respectively, with PKHH being most preferred.

This phenoxy resin has effects on the achievement of heat resistance, blocking resistance and wear resistance, and shows physical properties suitable for the binder because it does not give off any corrosive gas even when stored at high temperature and humidity. However, a portion of the phenoxy resin that has an affinity to the carbon black or inorganic powder is limited to an ester bond and a side chain of a hydroxyl group; that is, this phenoxy resin, when used alone, is insufficient in terms of the dispersion of the carbon black or inorganic powder and the stability of the dispersion. The sole use of the phenoxy resin is also insufficient in terms of adhesion of the back coat layer to the non-magnetic supporting substrate.

The polyurethane resin is particularly effective because it makes contribution to wear resistance and its adhesion to the supporting substrate is good. The polyurethane resin has a polar or amino group in its main or side chain.

A polyurethane resin is a general term of resins obtained by reactions between hydroxyl group-containing resins such as polyester polyols and/or polyether polyols and polyisocyanate group-containing compounds. These resins are obtained by polymerizing the starting raw materials for synthesis (which will be explained in detail) to a number-average molecular weight of about 5,000 to 200,000, and have a Q value (weight-average molecular weight/number-average molecular weight) of about 1.5 to 4.

In the practice of the invention, use is made of at least two urethane resins showing different glass transition temperatures Tg in the range of $-20°$ C.$\leq$Tg$\leq$80° C. in the binder used. The total amount of the urethane resins is 10 to 90% by weight based on the total weight of the binder. The incorporation of a plurality of polyurethane resins is preferable because a well-balanced compromise between running stability, calendering susceptibility, and electromagnetic characteristics in a high-temperature environment can be achieved.

The hydroxyl group-containing compounds used as the starting raw materials for such polyurethane resins include polyalkylene glycols such as polyethylene glycol, polybutylene glycol and polypropylene glycol, alkylene oxide adducts such as bisphenol A, and polyester polyols having various glycols and hydroxyl groups at termini of molecular chains.

The carboxylic acid component of the starting polyester polyol, for instance, includes aromatic dicarboxylic acids such as terephthalic acid, isophthalic acid, orthophthalic acid and 1,5-naphthalic acid, aromatic hydroxycarboxylic acids such as p-hydroxybenzoic acid and p-(hydroxyethoxy) benzoic acid, aliphatic dicarboxylic acids such as succinic acid, adipic acid, azelaic acid, sebacic acid and dodecane dicarboxylic acid, unsaturated fatty acids and alicyclic dicarboxylic acids such as fumaric acid, maleic acid, itaconic acid, tetrahydrophthalic acid and hexahydrophthalic acid, and tri- and tetra-carboxylic acids such as trimellitic acid, trimesic acid and pyromellitic acid. The alcohol component of the polyether polyol, for instance, includes compounds having 2, 3 or 4 hydroxyl groups such as ethylene glycol, propylene glycol, 1,3-propanediol, 1,4-butanediol, 1,5-pentanediol, 1,6-hexanediol, neopentyl glycol, diethylene glycol, dipropylene glycol, 2,2,4-trimethyl-1,3-pentanediol, 1,4-cyclohexanedimethanol, an alkylene oxide adduct such as bisphenol A, an alkylene oxide adduct of hydrogenated bisphenol A, polyethylene glycol, polypropylene glycol, polytetramethylene glycol, trimethylolethane, trimethylolpropane, glycerin, and pentaerythritol.

Lactone base polyester diol chains obtained by the ring opening polymerization of lactones such as caprolactone, too, are mentioned for the polyester polyol.

The polyisocyanate used herein, for instance, include diisocyanate compounds such as tolylene diisocyanate, phenylene diisocyanate, diphenylmethane duisocyarate, hexamethylene diisocyanate, tetramethylene diisocyanate, naphthalene diisocyanate, isophorone diisocyanate, xylylene diisocyanate, diisocyanato methylcyclohexane, diisocyanato cyclohexylmethane, dimethoxybiphenylene diisocyanate and diisocyanato diphenyl ether, and triisocyanate compounds such as trimers wherein at most 7 mol % of all isocyanate groups is trimethylene diisocyanate, and hexamethylene diisocyanate.

It is preferable to introduce an amino group as a polar group in the polyurethane resin by means of copolymerization or addition reaction, and it is preferable that about 0.2 to 10, especially about 0.5 to 5 polar groups are present per polyurethane molecule. In this case, it is likely that $NH_3^+$ may be introduced in the polyurethane resin, but no problem arises if the amount of $NH_3^+$ is at most 50 mol % of the amino groups. The polar groups may be present in a main or branched chain of the skeletal resin.

In the practice of the invention, more preferable results are obtained by incorporating a tertiary amino group represented by the following formula (2) as the amino group in a molecular chain of the polyurethane resin.

Formula (2)

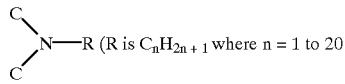

The thermoplastic polyurethane resin having a tertiary amine in its molecular chain may be obtained from the aforesaid polyisocyanate, a tertiary amino group-containing diol, and a mixture of this diol with a tertiary amino group-free chain form of diol. For the polyisocyanate use may be made of those exemplified hereinbefore, but it is particularly preferable to use 4,4'-diphenylmethane diisocyanate, hexamethylene diisocyanate, 2,4-tolylene diisocyanate, and 2,6-tolylene diisocyanate alone or in admixture.

For the tertiary amino group-free chain form of diol, mention is made of hydroxyl-terminated polyether polyols having a molecular weight of 500 to 6,000, the aforesaid polyester polyols, and low-molecular-weight glycols.

For the-low-molecular-weight glycols, the aforesaid glycols used for the production of the aforesaid polyesters may be used alone or in admixture. It is also acceptable to use diols with 2 to 4 moles of ethylene oxide, propylene oxide, butylene oxide, etc. added to bisphenol A, and hydroquinone.

Examples of the diol having a tertiary amino grout in its molecular chain are diols obtained by the addition of 2 to 50 moles of ethylene oxide, propylene oxide, and butylene oxide to primary amines represented by R—$NH_2$ (R is $C_n+H_{2n+1}$ where n=1 to 20), and derivatives thereof, for instance, diols obtained by adding ethylene oxide, propylene oxide, etc. to alkyl amines such as N-alkyldiethanolamines, e.g., N-methyldiethanolamine, N-ethyldiethanolamine and N-isopropyldiethanolamine obtained by adding 2 moles of ethylene oxide to primary amines such as methylamine, ethylamine, isopropylamine, n-butylamine and isobutylamine, and polyoxyethylenelaurylamine, polyoxyethylenestearylamine and polyoxyethyleneoleylamine obtained by adding 2 to 50 moles of ethylene oxide to laurylamine, stearylamine, and oleylamine.

It is also acceptable to use polyester diols that are mixed systems of the aforesaid N-alkyldiethanolamine and the aforesaid glycols, obtained by the polycondensation of the aforesaid dibasic acids and their acid esters, and halides.

It is noted that the binder according to the invention may contain various known resins in an amount of up to 20% by weight based on the total weight of the binder.

Such an urethane resin may be obtained by the reaction of starting raw materials containing a compound having a specific polar group and/or a starting resin allowed to react with a compound having a specific polar group in the presence or absence of a solvent according to known methods.

That is, reaction methods used for polyurethane resin production include melt polymerization where the aforesaid starting raw materials are polymerized in a molten state, and solution polymerization where the aforesaid starting raw materials are polymerized while they are dissolved in an inert agent such as methyl acetate, methyl ethyl ketone, acetone, and toluene which may be used alone or in admixture. The solution polymerization is suitable for the production of polyurethane resins which are often used while they are dissolved in a solvent as is the case with binders in magnetic recording media. Especially when a prepolymer is prepared, it is preferable that the aforesaid inert solvent is added to a solution polymerization system before a chain extension reaction takes place.

To the reaction system, a catalyst, e.g., an organic metal compound such as stannous octylic acid salt and dibutyltin dilaurate or a tertiary amine such as N-methylmorpholine and triethylamine may be added.

The number-average molecular weight of such a tertiary amino group-containing polyurethane resin is in the range of preferably 15,000 to 60,000 and more preferably 20,000 to 45,000. When this molecular weight is less than 15,000, dusting is increased with a durability drop. At greater than 60,000, on the other hand, there is a drop of the solubility of the polyurethane resin in a solvent.

Because of the presence of such amino groups, the polyurethane resin shows a good affinity to the carbon black. Examples of such polyurethane resin are N3160 and N3167 made by Nippon Polyurethane Industries, Ltd.

Usually, polyurethane resins have effects on imparting adhesion and toughness to the back coat layer. However, the polyurethane resin used in the invention, because of containing amino groups in its molecule, does not only have the aforesaid features but also shows a good affinity to the carbon black and inorganic powder and so is well dispersible. For this reason, the polyurethane resin of the invention can make up for the properties of the phenoxy resin and, hence, enables a good back coat surface to be formed.

Furthermore, the binder used herein contains a polyisocyanate compound. The presence of this polyisocyarate compound can prevent the blocking of the magnetic surface and the back coat surface, which may otherwise take place during long-term storage or storage at high temperature and humidity. For the polyisocyanate compound, at least one of 2,4-tolylene diisocyanate, 1,6-hexamethylene diisocyanate and methylene diisocyanate or an isocyanurate type triisocyanate where three molecules of the diisocyanate compound are bonded together may be used. A polyisocyanate compound having a straight or branched chain structure or a cyclic structure may be used. In view of friction and blocking, however, preference is given to a cyclic polyisocyanate as disclosed in JP-B 7-9692. It is believed that a tough three-dimensional structure of binder resin is more easily achievable by use of the cyclic polyisocyanate than by use of the straight or branched chain form of polyisocyanate. An example of the straight chain form of polyisocyanate compound is Colonate L made by Nippon Polyurethane Industries, Ltd., an example of the branched chain form of polyisocyanate compound is Colonate HL made by Nippon Polyurethane Industries, Ltd., and an example of the cyclic polyisocyanate compound is C2030 made by Nippon Polyurethane Industries, Ltd.

Based on 100 parts by weight of the binder in the present invention, the binder contains 10 to 50 and preferably 20 to 40 parts by weight of the phenoxy resin, 50 to 80 and preferably 60 to 80 parts by weight of the —NH$_2$— containing thermoplastic polyurethane, and 10 to 30 and preferably 10 to 20 parts by weight of the polyisocyanate compound.

The back coat layer of the invention may be formed by coating on the non-magnetic supporting substrate. To mill the coating components for the back coat layer, the aforesaid non-magnetic powder and binder may be concurrently charged in a mill. Alternatively, they may be separately charged in the mill in a successive manner. For instance, the non-magnetic powders may be added to a binder-containing solution, and milling may be conducted for a given time to prepare a coating material for the back coat layer.

For milling and dispersion, various milling machines may be used. For instance, use may be made of two-roll mills, three-roll mills, ball mills, pebble mills, sand grinders, Sqegvari attritors, high-speed impeller dispersing machines, high-speed stone mills, high-speed impact mills, dispersion kneaders, high-speed mixers, homogenizers, and ultrasonic dispersing machines.

The thus prepared coating material for the back coat layer may be coated on one surface of the non-magnetic supporting substrate in known manners. For instance, use may made of coating techniques utilizing gravure roll coating, extrusion nozzle coating, reverse roll coating, wire bar coating, doctor blade coating, dip coating, air knife coating, calender coating, squeegee coating, kiss coating, and fountain coating.

Usually, it is preferred that the coating layer has a thickness of 0.1 to 1.5 μm, and especially 0.3 to 0.6 μm, and a surface roughness of up to 20 nm, and especially up to 15 nm as expressed in terms of a center line-average roughness (Ra) at 0.08 μm cutoff. Such surface smoothness can prevent the transfer of the back coat surface onto the magnetic surface.

The non-magnetic supporting substrate may be formed of polyesters such as polyethylene terephthalate and polyethylene-2,6-naphthalate, polyamides, polyimides, polyolefins such as polypropylene, and cellulose derivatives such as cellulose triacetate and cellulose diacetate. This non-magnetic supporting substrate, in a tape form for instance, has a thickness of usually 3 to 20 μm, and preferably 5 to 15 μm.

The magnetic layer formed on the other surface of the non-magnetic supporting substrate is obtained by dispersing magnetic powders, preferably ferromagnetic powders in a binder. Examples of such ferromagnetic powders are Fe—Al alloy powders, Fe—Al—P alloy powders, Fe—Ni—Co alloy powders, Fe—Mn—Zn alloy powders, Fe—Co—Ni—Cr alloy powders, Fe—Co—Ni—P alloy powders, Co—Ni alloy powders, Co—P alloy powders, ferromagnetic alloy powders composed mainly of ferromagnetic metals such as Fe, Ni and Co, and oxide magnetic powders such as those of γ-Fe$_2$O$_3$, Ba·Fe$_2$O$_3$, and Co-containing γ-Fe$_2$O$_4$. These ferromagnetic powders are not critical in terms of shape, and so may have an acicular, spherical or elliptical shape, for instance.

For the binder for ferromagnetic powders, use may be made of thermoplastic resins, heat curable resins, reactive type resins, resins curable by exposure to electron beams, and mixtures thereof, which have been used so far in the art. The aforesaid binders used for the back coat layer are also usable in this case. These binders may be used alone or in combination of two or more. The ferromagnetic powders are preferably used in an amount of 300 to 800 parts by weight per 100 parts by weight of binder.

The magnetic layer may contain, in addition to the ferromagnetic powders and binder, additives such as lubricants, antistatics, curing agents, and polishing agents, if required. It is noted that each additive is not necessarily used for one single purpose. In some cases, one single compound may act as a combined lubricating and antistatic agent. The magnetic layer may be produced and coated as explained in connection with the back coat layer.

In the practice of the invention, it is acceptable to form the magnetic layer by forming a ferromagnetic metal (or alloy) thin film on the non-magnetic supporting substrate by vacuum evaporation, sputtering, ion plating, electroplating or chemical plating of a ferromagnetic metal material based on cobalt or iron, or Co—Ni or Co—Cr alloys. Such a ferromagnetic metal thin film may be obtained using known materials and methods as disclosed in U.S. Pat. No. 4,135,016. This so-called metal type magnetic layer has a surface roughness of usually 0.01 μm or less as measured at 0.17 μm cutoff and expressed in terms of R20 (an average of 20 measurements). By using this magnetic layer in combination with the back coat layer of the invention, satisfactory results can be obtained regarding running performance, storability and the like.

If necessary, the aforesaid magnetic layer may be provided with known various protective or lubricating layers.

By way of illustration but not by way of limitation, the present invention will now be explained at great length with reference to examples.

Formation of Magnetic Layer

By vacuum oblique evaporation of an alloy composed mainly of cobalt, a cobalt base ferromagnetic metal thin film of 0.2 μm in thickness was formed on one surface of a base film formed of a biaxially elongated polyethylene terephthalate of 6.5 μm in thickness. A hard carbon film of 40 nm in thickness was formed on the ferromagnetic metal thin film by plasma CVD. A solution of a fluorine base lubricant in an organic solvent such as FEK was coated on the hard carbon film to form a lubricating film. In this regard, it is noted that the magnetic layer was formed after the provision of the back coat layer.

Formation of Back Coat Layer

Combinations of materials shown in Tables 1 to 3 were mixed in a ball mill for 48 hours, with exception that the polyisocyanate compound was excluded from such combinations. The mixture was then passed through a filter, and the polyisocyanate compound was added thereto to prepare a coating material for the back coat. The coating material was coated on the back surface of the base film to form a back coat layer of 0.6 μm in thickness as measured after drying. The obtained tape was cut to a width of 8 mm, and loaded in a cassette to measure its properties. The "pbw" in Tables 1 to 3 is an abbreviation of part by weight, and the figures in parentheses indicate average particle diameters (nm).

TABLE 1

|  | Main CB | Sub-CB | Inorganic powders | Phenoxy resin | TPPU | PIC |
|---|---|---|---|---|---|---|
| Ex. 1 | SB250 (56) 100 | not used | TF100[100/6] 3 | PKHH 30 | N3160 50 | C2030 20 (pbw) |
| Ex. 2 | SB100 (50) 100 | not used | TF100[100/6] 3 | PKHH 30 | N3160 50 | C2030 20 |
| Ex. 3 | MA220 (55) 100 | not used | TF100[100/6] 3 | PKHH 30 | N3160 50 | C2030 20 |
| Ex. 4 | R500 (53) 100 | not used | TF100[100/6] 3 | PKHH 30 | N3160 50 | C2030 20 |
| Ex. 5 | A#60 (45) 100 | not used | TF100[100/6] 3 | PKHH 30 | N3160 50 | C2030 20 |
| Ex. 6 | A#55 (66) 100 | not used | TF100[100/6] 3 | PKHH 30 | N3160 50 | C2030 20 |
| Ex. 7 | SB250 (56) 95 | FT (80) 5 | TF100[100/6] 3 | PKHH 30 | N3160 50 | C2030 20 |
| Ex. 8 | SB250 (56) 90 | FT (80) 10 | TF100[100/6] 3 | PKHH 30 | N3160 50 | C2030 20 |
| Ex. 9 | SB250 (56) 80 | FT (80) 20 | TF100[100/6] 3 | PKHH 30 | N3160 50 | C2030 20 |
| Ex. 10 | SB250 (56) 100 | not used | TF100[100/6] 0.5 | PKHH 30 | N3160 50 | C2030 20 |
| Ex. 11 | SB250 (56) 100 | not used | TF100[100/6] 5 | PKHH 30 | N3160 50 | C2030 20 |
| Ex. 12 | SB250 (56) 100 | not used | TF100[100/6] 10 | PKHH 30 | N3160 50 | C2030 20 |
| Ex. 13 | S8250 (56) 100 | not used | HCD[100/3] 5 | PKHH 30 | N3160 50 | C2030 20 |
| Ex. 14 | SB250 (56) 100 | not used | HCD[100/3] 10 | PKHH 30 | N3160 50 | C2030 20 |
| Ex. 15 | SB250 (56) 100 | not used | TF100[100/6] 3 | PKHH 30 | N3160 50 | Colonate L 20 |

Main CB: main carbon black
Sub-CB: subordinate carbon black
TPPU: thermoplastic polyurethane
PIC: polyisocyanate compound
A#60: Asahi #60
A#55: Asahi #55
FT: Asahi Thermal
HCD: Homocal D
The figures in parentheses indicate average primary particle diameters in nm, and the figure/figures in brackets indicate average particle diameters in nm and Mohs hardnesses, respectively.

TABLE 2

|  | Main CB | Sub-CB | Inorganic powders | Phenoxy resin | TPPU | PIC |
|---|---|---|---|---|---|---|
| CE 1 | ConductexSC 100 (20)* | not used | TF100[100/6] 3 | PKHH 30 | N3160 50 | Colonate L 20 |
| CE 2 | R1060 (30)* 100 | not used | TF100[100/6] 3 | PKHH 30 | N3160 50 | Colonate L 20 |
| CE 3 | #1000 (18)* 100 | not used | TF100[100/6] 3 | PKHH 30 | N3160 50 | Colonate L 20 |
| CE 4 | MA8B (24)* 100 | not used | TF100[100/6] 3 | PKHH 30 | N3160 50 | Colonate L 20 |
| CE 5 | FT (80)* 100 | not used | TF100[100/6] 3 | PKHH 30 | N3160 50 | Colonate L 20 |
| CE 6 | #5 (85)* 100 | not used | TF100[100/6] 3 | PKHH 30 | N3160 50 | Coionate L 20 |
| CE 7 | RAVEN410(101)* 100 | not used | TF100[100/6] 3 | PKHH 30 | N3160 50 | Colonate L 20 |
| CE 8 | ConductexSC* 100 (20) | FT (80) 10 | TF100[100/6] 3 | PKHH 30 | N3160 50 | Colonate L 20 |
| CE 9 | ConductexSC* 80 (20) | FT (80) 20 | TF100[100/6] 3 | PKHH 30 | N3160 50 | Colonate L 20 |
| CE 10 | ConductexSC* 70 (20) | FT (80) 30 | TF100[100/6] 3 | PKHH 30 | N3160 50 | Colonate L 20 |

TABLE 2-continued

| | Main CB | Sub-CB | Inorganic powders | Phenoxy resin | TPPU | PIC |
|---|---|---|---|---|---|---|
| CE 11 | ConductexSC* 60 (20) | FT (80) 40 | TF100[100/6] 3 | PKHH 30 | N3160 50 | Colonate L 20 |
| CE 12 | R1060 (30)* 70 | FT (80) 30 | TF100[100/6] 3 | PKHH 30 | N3160 50 | Colonate L 20 |
| CE 13 | #1000 (18)* 70 | FT (80) 30 | TF100[100/6] 3 | PKHH 30 | N3160 50 | Colonate L 20 |
| CE 14 | MA8B (24)* 70 | FT (80) 30 | TF100[100/6] 3 | PKHH 30 | N3160 50 | Colonate L 20 |
| CE 15 | SB250 (56) 100 | not used | not used* | PKHH 30 | N3160 50 | Colonate L 20 |

CE: comparative example
*departing from the presently defined range

TABLE 3

| | Main CB | Sub-CB | Inorganic powders | Phenoxy resin | TPPU | PIC |
|---|---|---|---|---|---|---|
| CE 16 | SB250 (56) 100 | not used | TF100[100/6] 12* | PKHH 30 | N3160 50 | Colonate L 20 |
| CE 17 | SB250 (56) 100 | not used | HCD[100/3] 15* | PKHH 30 | N3160 50 | Colonate L 20 |
| CE 18 | SB250 (56) 100 | not used | TF140[200/6]* 3 | PKHH 30 | N3160 50 | Colonate L 20 |
| CE 19 | SB250 (56) 100 | not used | HEKO 5 [30/3]* | PKHH 30 | N3160 50 | Colonate L 20 |
| CE 20 | SB250 (56) 100 | not used | HEK PZ 5 [200/3]* | PKHH 30 | N3160 50 | Colonate L 20 |
| CE 21 | SB250 (56) 100 | not used | TF100[100/6] 3 | PKHH 30 | N2301* 50 | Colonate L 20 |
| CE 22 | SB250 (56) 100 | not used | TF100[100/6] 3 | PKHH 30 | N2304* 50 | Colonate L 20 |
| CE 23 | SB250 (56) 100 | not used | TF100[100/6] 3 | PKHH 30 | —COOH* 50 | Colonate L 20 |
| CE 24 | SB250 (56) 100 | not used | TF100[100/6] 3 | PKHH 30 | —SO$_3$Na* 50 | Colonate L 20 |
| CE 25 | SB250 (56) 100 | not used | TF100[100/6] 3 | PKHH 0* | N3160 80 | Colonate L 20 |
| CE 26 | SB250 (56) 100 | not used | TF100[100/6] 3 | PKHH 100 | N3160 0* | Colonate L 20 |
| CE 27 | SB250 (56) 100 | not used | TF100[100/6] 3 | BTH-1/2* 30 | N3160 50 | Colonate L 20 |
| CE 28 | SB250 (56) 100 | not used | TF100[100/6] 3 | MR110* 30 | N3160 50 | Colonate L 20 |
| CE 29 | SB250 (56) 100 | not used | TF100[100/6] 3 | PKHH 30 | N3160 50 | not used* |

HEK: Hakuenka

Given below are specific examples of the invention as well as comparative examples.

EXAMPLE 1

As the carbon black in the composition of the coating material for the back coat, Special Black 250 made by Degusa Co., Ltd. was used, which had an average particle diameter of 56 nm, a BET value of 40 m$^2$/g, a DPB oil absorption of 48 ml/100 g, a PH value of 3 and a volatile matter content of 3.5%. In the tables, Special Black 250 is abbreviated as SB250. Alpha-iron oxide TF100 made by Toda Kogyo Co., Ltd. (which had an average particle diameter of 100 nm and a Mohs hardness of 6) was used as the inorganic powders. PAPHEN Phenoxy Resins PKHH made by Phenoxy Associates Co., Ltd. (which had a number-average molecular weight of 14,000 to 16,000, a nonvolatile matter content of 99%, a specific gravity of 1.17 to 1.19, a viscosity (25° C., cP) of 525 to 715, and a theoretical hydroxyl group equivalent of 284) and Polyurethane N3160 made by Nippon Polyurethane Industries Co., Ltd. (which had a number-average molecular weight of 35,000, a Q value (Mw/Mn) of 2.2 and 4 to 5 amino groups introduced per molecule) were used as the binder. C2030 made by Nippon Polyurethane Industries Co., Ltd. was used as the polyisocyanate compound.

EXAMPLES 2–6

In the composition of the coating material for the back coat in example 1, the carbon black alone was varied.

In example 2, Special Black 100 made by Degusa Co., Ltd. was used, which had an average particle diameter of 50 nm, a BET value of 30 m$^2$/g, a DBP oil absorption of 94 ml/100 g, a PH value of 3.3 and a volatile matter content of 2.2%. In the tables, this was abbreviated as SB100.

In example 3, MA220 made by Mitsubishi Chemical Industries, Ltd. was used, which had an average particle diameter of 55 nm, a BET value of 31 m²/g, a DBP oil absorption of 91 ml/100 g, a PH value of 3.0 and a volatile matter content of 1.0%.

In example 4, Raven 500 made by Colombian Chemicals Company was used, which had an average particle diameter of 53 nm, a BET value of 48 m²/g, a DBP oil absorption of 75 ml/100 g, a PH value of 7.0 and a volatile matter content of 1.2%. In the tables, this was abbreviated as R500.

In example 5, #60 made by Asahi Carbon Co., Ltd. was used, which had an average particle diameter of 45 nm, a BET value of 40 m²/g, a DBP oil absorption of 114 ml/100 g and a volatile matter content of 1.0%.

In example 6, #55 made by Asahi Carbon Co., Ltd. was used, which had an average particle diameter of 66 nm, a BET value of 26 m²/g, a DBP oil absorption of 87 ml/100 g and a volatile matter content of 1.0%.

EXAMPLES 7–9

For the carbon black in the composition of the coating material for the back coat in Example 1, SB 250 and a given amount of Asahi Thermal made by Asahi Carbon Co., Ltd. (which had an average particle diameter of 80 nm, a BET value of 24 m²/g, a DBP oil absorption of 28 ml/100 g and a volatile matter content of 1.0%) were used in the total amount of 100 parts by weight.

EXAMPLE 10

In example 1, the amount of α-iron oxide TF100 was changed from 3 parts to 0.5 parts.

EXAMPLE-11

In example 1, the amount of α-iron oxide TF100 was changed from 3 parts to 5 parts.

EXAMPLE 12

In example 1, the amount of α-iron oxide TF100 was changed from 3 parts to 10 parts.

EXAMPLE 13

In example 11, Homocal D, a $CaCO_3$ product made by Shiraishi Kogyo Co., Ltd. (which had an average particle diameter of 70 nm and a Mohs hardness of 3) was used as the inorganic powder.

EXAMPLE 14

In example 13, the amount of Homocal D was changed from 5 parts to 10 parts.

EXAMPLE 15

In example 1, the polyisocyanate compound was changed from C2030 made by Nippon Polyurethane Industries Co., Ltd. to Colonate L made by Nippon Polyurethane Industries Co., Ltd.

COMPARATIVE EXAMPLES 1–4

In comparative example 1, a coating material for the back coat was prepared using a similar composition as used in Example 1 with the exception that Conductex SC made by Colombian Chemicals Company, which had an average particle diameter of 20 nm, a BET value of 220 m²/g, a DBP oil absorption of 115 ml/100 g, a PH value of 7.0 and a volatile matter content of 1.5%, was used as the carbon black. This is abbreviated as SC in the tables.

In comparative example 2, Raven 1060 made by Colombian Chemicals Company was used, which had an average particle diameter of 30 nm, a BET value of 70 m²/g, a DBP oil absorption of 48 ml/100 g, a PH value of 2.4 and a volatile matter content of 2.1%. In the tables, this was abbreviated as R1060.

In comparative example 3, #1000 made by Mitsubishi Chemical Industries, Ltd. was used, which had an average particle diameter of 18 nm, a BET value of 200 m²/g, a DBP oil absorption of 55 ml/100 g, a PH value of 3.0 and a volatile matter content of 3.0%.

In comparative example 4, MA8 made by Mitsubishi Chemical Industries, Ltd. was used, which had an average particle diameter of 24 nm, a BET value of 120 m²/g, a DBP oil absorption of 58 ml/100 g, a PH value of 3.0 and a volatile matter content of 3.5%.

COMPARATIVE EXAMPLES 5–7

In comparative example 5, a coating material for the back coat was prepared using a similar composition as used in example 1 with the exception that Asahi Thermal lade by Asahn Carbon Co., Ltd., which had an average particle diameter of 80 nm, a BET value of 24 m²/g, a DBP oil absorption of 28 ml/100 g and a volatile matter content of 1.0%, was used as the carbon black. This is abbreviated as FT in the tables.

In comparative example 6, #5 made by Mitsubishi Chemical Industries, Ltd. was used, which had an average particle diameter of 85 nm, a BET value of 25 m²/g, a DBP oil absorption of 71 ml/100 g, a PH value of 8.0 and a volatile matter content of 0.4%.

In comparative example 7, Raven 410 made by Colombian Chemicals Company was used, which had an average particle diameter of 101 nm, a BET value of 27 m²/g, a DBP oil absorption of 65 ml/100 g, a PH value of 8.3 and a volatile matter content of 0.7%.

COMPARATIVE EXAMPLES 8–11

Mixtures of given amounts of Conductex SC and Asahi Thermal were used as the carbon blacks.

COMPARATIVE EXAMPLES 12–14

Mixtures of given amounts of Raven 1060, #1000 and MA 8 made by Mitsubishi Chemical Industries, Ltd., and Asahi Thermal were used as the carbon blacks.

COMPARATIVE EXAMPLES 15

TF100 (inorganic pigment) was excluded from example 1.

COMPARATIVE EXAMPLE 16

The amount of TF100 in example 1 was increased as 12 parts by weight.

COMPARATIVE EXAMPLE 17

The amount of Homocal D in example 12 was increased to 15 parts by weight.

COMPARATIVE EXAMPLE 18

The inorganic powder added in example 1 was changed from α-iron oxide TF100 made by Toda Kogyo Co., Ltd. (and having an average particle diameter of 100 nm and a Mohs hardness of 6) to αX-iron oxide TF140 made by Toda Kogyo Co., Ltd. (and having an average particle diameter of 200 nm and a Mohs hardness of 6).

COMPARATIVE EXAMPLE 19

The inorganic powder added in example 13 was changed from Homocal D, a $CaCO_3$ product made by Shiraishi Kogyo Co., Ltd. (and having an average particle diameter of 70 nm and a Mohs hardness of 3) to Hakuenka O, a $CaCO_3$ product made by Shiraishi Kogyo Co., Ltd. (and having an average particle diameter of 30 nm and a Mohs hardness of 3).

COMPARATIVE EXAMPLE 20

The inorganic powder added in example 13 was changed from Homocal D, a $CaCO_3$ product made by Shiraishi Kogyo Co., Ltd. (and having an average particle diameter of 70 nm and a Mohs hardness of 3) to Hakuenka PZ, a $CaCO_3$ product made by Shiraishi Kogyo Co., Ltd. (and having an average particle diameter of 200 nm and a Mohs hardness of 3).

COMPARATIVE EXAMPLES 21–24

The thermoplastic polyurethane resin used in example 1 was varied as follows.

In comparative examples 21 and 22, Polyurethane N2301 and N2304, both made by Nippon Polyurethane Industries Co., Ltd. and free of a polar group, were used.

In comparative example 23, Resin TIM6600 made by Sanyo Kasei Kogyo Co., Ltd. and containing —COOH as a polar group, was used.

In comparative example 24, TS9121 made by Toyobo Co., Ltd. and containing —$SO_3Na$ as a polar group, was used.

COMPARATIVE EXAMPLE 25

The phenoxy resin was excluded from example 1.

COMPARATIVE EXAMPLE 26

The thermoplastic polyurethane was excluded from example 1; the phenoxy resin alone was used.

COMPARATIVE EXAMPLE 27

The phenoxy resin used in example 1 was changed to Cellunova BTH-1/2, a cellulosic resin product made by Asahi Chemical Industry Co., Ltd.

COMPARATIVE EXAMPLE 28

The phenoxy resin used in example 1 was changed to MR110 (containing an epoxy group and a sulfur base polar group), a vinyl chloride resin product made by Nippon Zeon Co., Ltd.

COMPARATIVE EXAMPLE 29

The polyisocyanate compound was excluded from example 1.

The results of estimation of the obtained tapes are shown in Tables 4 to 6. How to estimate the properties of tapes is described below.

Endurance Friction

A sample tape was wound around a 2 mmΦ SUS 303 pin (having a surface roughness of 0.2S or more) through 180°, with the back coat surface in opposition to the pin surface. Upon a 20-gram weight load, the tape was then reciprocated one hundred times at a speed of 120 cm/min. and a stroke of 50 mm to measure the coefficient of friction after the 1st pass and the 100th pass and make investigation of to what degree the tape was damaged after the 100th pass. The surface of the magnetic layer of the tape was observed under an optical microscope having a magnification of 100 to make estimation of to what degree the tape was damaged upon the following criteria. It is desired that the coefficient of friction be as low as possible, but a coefficient of friction of 0.23 or lower is practically acceptable.

○: No damage was observed at all.

Δ: A few fine damages were observed.

X: The tape was damaged to a considerable depth.

Surface Roughness

Using a surface roughness meter TALYSTEP made by Rank Taylor-Hobson Corp., center line-average roughness Ra and ten point-average roughness Rz were measured at 0.08 mm cutoff according to JIS B-0681.

Storability

Following the initial surface observation and drop-out (DO) measurement of a sample tape, the sample tape was measured in terms of storability after storage in an environment of 50° C. and 80% RH for 7 days. Used for the DO measurement was a Sony VTR: EV-S900, and the momentary vanishing of video output signals was measured at 3 μsec. and −10 dB using a drop-out counter.

Blocking

After storage as mentioned above, the sample tape was measured in terms of blocking to make estimation of to what degree blocking occurred upon the following criteria.

○ indicates that the back coat surface came naturally off the magnetic surface in the tangential direction of the reel, and X indicates that the back coat surface stuck to the magnetic surface.

Discoloration of Magnetic Layer

After storage as mentioned above, the surface of the magnetic layer of the sample tape was visually observed with ○ indicating that nothing abnormal was found and X indicating that discoloration was found.

Transfer of Back Coat Layer

After storage as mentioned above, the surface of the magnetic layer of the sample tape was observed under an optical microscope having a magnification of 100 to make estimation of whether or not transfer of the back coat layer occurred upon the following criteria.

○: No transfer was observed at all.

Δ: A slight transfer was observed.

X: Many transfers of the order of about 1 nmΦ were observed at a magnification of 100.

Rate of Drop-Out (DO) Increase

After storage as mentioned above, the sample tape was run for REC/PLAY to take drop-out (DO) measurements. The rate of DO increase is given by dividing the DO measurement by the DO value found before storage.

TABLE 4

| | Surface Roughness (nm) | | Endurance Friction η 20° C. & 60% | | | Endurance Friction η 40° C. & 80% | | | Storability (at 50° C. & 80% for 7 days) | | | |
|---|---|---|---|---|---|---|---|---|---|---|---|---|
| | | | 1st | 100th | | 1st | 100th | | | Discoloration of | Transfer of | Rate of |
| | Ra | Rz | pass | pass | Damage | pass | pass | Damage | Blocking | Magnetic Layer | Back Coat | DO increase |
| Ex. 1 | 13.5 | 110 | 0.20 | 0.20 | ○ | 0.20 | 0.20 | ○ | ○ | ○ | ○ | 1.2 |
| Ex. 2 | 13.0 | 105 | 0.22 | 0.22 | ○ | 0.20 | 0.22 | ○ | ○ | ○ | ○ | 1.2 |
| Ex. 3 | 14.5 | 115 | 0.21 | 0.22 | ○ | 0.20 | 0.22 | ○ | ○ | ○ | ○ | 1.3 |
| Ex. 4 | 15.5 | 120 | 0.19 | 0.20 | ○ | 0.19 | 0.19 | ○ | ○ | ○ | ○ | 1.3 |
| Ex. 5 | 16.6 | 125 | 0.18 | 0.20 | ○ | 0.18 | 0.19 | ○ | ○ | ○ | ○ | 1.3 |
| Ex. 6 | 17.5 | 127 | 0.18 | 0.18 | ○ | 0.18 | 0.18 | ○ | ○ | ○ | ○ | 1.4 |
| Ex. 7 | 15.5 | 117 | 0.18 | 0.18 | ○ | 0.18 | 0.18 | ○ | ○ | ○ | ○ | 1.4 |
| Ex. 8 | 16.5 | 126 | 0.17 | 0.18 | ○ | 0.18 | 0.18 | ○ | ○ | ○ | ○ | 1.5 |
| Ex. 9 | 17.9 | 130 | 0.15 | 0.16 | ○ | 0.15 | 0.15 | ○ | ○ | ○ | Δ | 1.5 |
| Ex. 10 | 13.0 | 105 | 0.20 | 0.21 | ○ | 0.20 | 0.21 | Δ | ○ | ○ | ○ | 1.1 |
| Ex. 11 | 15.2 | 115 | 0.19 | 0.19 | ○ | 0.19 | 0.19 | ○ | ○ | ○ | Δ | 1.4 |
| Ex. 12 | 16.2 | 130 | 0.19 | 0.19 | ○ | 0.18 | 0.18 | ○ | ○ | ○ | Δ | 1.5 |
| Ex. 13 | 13.0 | 107 | 0.21 | 0.21 | ○ | 0.21 | 0.23 | ○ | ○ | ○ | ○ | 1.2 |
| Ex. 14 | 17.5 | 131 | 0.20 | 0.20 | ○ | 0.21 | 0.21 | ○ | ○ | ○ | Δ | 1.2 |
| Ex. 15 | 13.3 | 109 | 0.21 | 0.22 | ○ | 0.20 | 0.22 | ○ | ○ | ○ | ○ | 1.2 |

TABLE 5

| | Surface Roughness (nm) | | Endurance Friction η 20° C. & 60% | | | Endurance Friction η 40° C. & 80% | | | Storability (at 50° C. & 80% for 7 days) | | | |
|---|---|---|---|---|---|---|---|---|---|---|---|---|
| | | | 1st | 100th | | 1st | 100th | | | Discoloration of | Transfer of | Rate of |
| | Ra | Rz | pass | pass | Damage | pass | pass | Damage | Blocking | Magnetic Layer | Back Coat | DO increase |
| CE 1 | 13.6 | 120 | 0.26 | 0.31 | ○ | 0.25 | 0.33 | Δ | ○ | ○ | ○ | 1.3 |
| CE 2 | 12.6 | 109 | 0.27 | 0.33 | ○ | 0.28 | 0.33 | Δ | ○ | ○ | ○ | 1.2 |
| CE 3 | 13.9 | 125 | 0.26 | 0.27 | ○ | 0.24 | 0.27 | Δ | ○ | ○ | ○ | 1.3 |
| CE 4 | 12.9 | 110 | 0.25 | 0.32 | ○ | 0.27 | 0.34 | Δ | ○ | ○ | ○ | 1.4 |
| CE 5 | 27.0 | 205 | 0.15 | 0.15 | ○ | 0.16 | 0.16 | ○ | ○ | ○ | × | 5.7 |
| CE 6 | 26.5 | 195 | 0.16 | 0.16 | ○ | 0.16 | 0.17 | ○ | ○ | ○ | × | 5.3 |
| CE 7 | 28.5 | 229 | 0.14 | 0.15 | ○ | 0.15 | 0.15 | ○ | ○ | ○ | × | 7.5 |
| CE 8 | 16.0 | 125 | 0.26 | 0.28 | ○ | 0.27 | 0.31 | Δ | ○ | ○ | ○ | 1.6 |
| CE 9 | 17.5 | 129 | 0.26 | 0.28 | ○ | 0.25 | 0.27 | ○ | ○ | ○ | ○ | 1.9 |
| CE 10 | 18.5 | 145 | 0.24 | 0.25 | ○ | 0.24 | 0.28 | ○ | ○ | ○ | Δ | 3.5 |
| CE 11 | 23.5 | 165 | 0.22 | 0.25 | ○ | 0.23 | 0.25 | ○ | ○ | ○ | × | 5.5 |
| CE 12 | 16.2 | 148 | 0.23 | 0.25 | ○ | 0.24 | 0.26 | ○ | ○ | ○ | Δ | 4.5 |
| CE 13 | 17.8 | 129 | 0.26 | 0.27 | ○ | 0.26 | 0.26 | ○ | ○ | ○ | ○ | 3.3 |
| CE 14 | 16.3 | 147 | 0.27 | 0.34 | ○ | 0.23 | 0.27 | ○ | ○ | ○ | Δ | 4.0 |
| CE 15 | 13.0 | 115 | 0.20 | 0.24 | ○ | 0.20 | 0.28 | × | ○ | ○ | ○ | 1.1 |

CE: Comparative example

TABLE 6

| | Surface Roughness (nm) | | Endurance Friction η 20° C. & 60% | | | Endurance Friction η 40° C. & 80% | | | Storability (at 50° C. & 80% for 7 days) | | | |
|---|---|---|---|---|---|---|---|---|---|---|---|---|
| | | | 1st | 100th | | 1st | 100th | | | Discoloration of | Transfer of | Rate of |
| | Ra | Rz | pass | pass | Damage | pass | pass | Damage | Blocking | Magnetic Layer | Back Coat | DO increase |
| CE 16 | 21.5 | 168 | 0.20 | 0.20 | ○ | 0.19 | 0.19 | ○ | ○ | ○ | × | 4.6 |
| CE 17 | 18.5 | 159 | 0.20 | 0.21 | ○ | 0.21 | 0.21 | ○ | ○ | ○ | × | 3.9 |
| CE 18 | 20.5 | 170 | 0.20 | 0.20 | ○ | 0.19 | 0.19 | ○ | ○ | ○ | × | 3.5 |
| CE 19 | 13.5 | 108 | 0.20 | 0.23 | Δ | 0.20 | 0.26 | × | ○ | ○ | ○ | 1.2 |
| CE 20 | 19.2 | 169 | 0.21 | 0.21 | ○ | 0.22 | 0.22 | ○ | ○ | ○ | × | 4.2 |

TABLE 6-continued

| | Surface Roughness (nm) | | Endurance Friction η 20° C. & 60% | | | Endurance Friction η 40° C. & 80% | | | Storability (at 50° C. & 80% for 7 days) | | | |
|---|---|---|---|---|---|---|---|---|---|---|---|---|
| | | | 1st pass | 100th pass | Damage | 1st pass | 100th pass | Damage | Blocking | Discoloration of Magnetic Layer | Transfer of Back Coat | Rate of DO increase |
| | Ra | Rz | | | | | | | | | | |
| CE 21 | 24.5 | 175 | 0.18 | 0.18 | ○ | 0.20 | 0.20 | ○ | ○ | ○ | × | 5.5 |
| CE 22 | 23.6 | 189 | 0.17 | 0.18 | ○ | 0.19 | 0.19 | ○ | ○ | ○ | × | 5.2 |
| CE 23 | 22.8 | 166 | 0.19 | 0.19 | ○ | 0.20 | 0.21 | ○ | ○ | ○ | × | 4.5 |
| CE 24 | 21.9 | 152 | 0.20 | 0.20 | ○ | 0.20 | 0.22 | ○ | ○ | ○ | × | 2.8 |
| CE 25 | 13.8 | 109 | 0.21 | 0.22 | ○ | 0.23 | 0.29 | × | ○ | ○ | ○ | 1.2 |
| CE 26 | 24.0 | 170 | 0.17 | 0.17 | ○ | 0.18 | 0.19 | ○ | ○ | ○ | × | 5.6 |
| CE 27 | 13.8 | 118 | 0.19 | 0.20 | ○ | 0.19 | 0.19 | ○ | ○ | × | ○ | 10.5 |
| CE 28 | 13.0 | 109 | 0.20 | 0.23 | ○ | 0.22 | 0.26 | ○ | ○ | ○ | ○ | 4.6 |
| CE 29 | 13.3 | 112 | 0.20 | 0.21 | ○ | 0.21 | 0.23 | ○ | × | ○ | ○ | snarling up |

CE: Comparative example

In what follows, the results of the examples and comparative examples are reviewed.

EXAMPLES 1 to 6

No grave problems arose at all; that is, satisfactory results were obtained.

EXAMPLES 7 to 9

The surface roughness is lowest at 5 parts by weight of Asahi Thermal, and increases as the amount of Asahi Thermal increases to 10 parts by weight, and to 20 parts by weight. The endurance friction decreases strikingly at 20 parts by weight of Asahi Thermal, with some noticeable transfer of the back surface observed after storage. The rate of drop-out (DO) increase, too, increases slightly as the amount of Asahi Thermal increases to 10 parts by weight, and to 20 parts by weight. In other words, the initial running friction tends to contradict the post-storage rate of DO increase. However, since the average particle diameter difference between SB250 and Asahi Thermal is not very large, i.e., 24 nm, the post-storage deterioration of DO lies within a practically acceptable range. Thus, the optimum range can be determined depending on the deck used, and the system, etc. in which the tape is loaded.

EXAMPLE 10

When the amount of TF100 is 0.5 parts by weight, the same characteristics as in examples 1 to 3 are substantially obtained. However, this example is slightly inferior to example 9 in terms of endurance friction at high temperature and damage but is superior to example 9 in terms of the post-storage transfer of the back surface and the rate of DO increase. Thus, the optimum range can be determined depending on the deck used, and the system, etc., in which the tape is loaded.

EXAMPLE 11

When the amount of TF100 is increased from 0.5 parts by weight to 5 parts by weight, the endurance friction at high temperature and damage are improved over those in example 10, but the post-storage transfer of the back surface and the rate of Do increase slightly. Thus, the optimum range can be determined depending on the deck used, and the system, etc., in which the tape is loaded.

EXAMPLE 12

Although the amount of TF100 was increased from 5 parts by weight to 10 parts by weight, the same characteristics as in example 11 were substantially obtained.

EXAMPLE 13

Homocal D was lower than TF100 in terms of Mohs hardness and was quantitatively smaller than that in example 12, but the same characteristics as in examples 11 and 12 were substantially obtained. The endurance friction at high temperature was slightly inferior to that in examples 11 and 12, but was practically acceptable.

EXAMPLE 14

The amount of Homocal D was larger than that in example 13. For this reason, the surface roughness was slightly larger than that in example 11 and transfer of the back surface became worse. However, all these were practically acceptable.

EXAMPLE 15

No grave problems arose; that is, satisfactory results were obtained.

COMPARATIVE EXAMPLES 1 to 4

In all these examples, the initial friction were too large for practical use.

COMPARATIVE EXAMPLES 5 to 7

Good endurance friction is obtained in all these examples. However, the tapes are not on any practical levee because too large a surface roughness gives rise to considerable transfer of the back surface after storage, and the rate of drop-out (DO) increase is too large for practical use as well.

COMPARATIVE EXAMPLE 8 to 11

Two carbon black species, Conductex SC and Asahi Thermal were used in combination. With this combination of two such carbon black species, however, the initial running friction could not be well balanced against the post-storage rate of Do increase. Especially in comparative example 11, the transfer of the back coat surface and the rate of DO increase become even worse.

COMPARATIVE EXAMPLES 12 to 14

In place of Conductex SC, Raven 1060, #1000 and MA8 differing in particle diameter were used. These examples were slightly lower than comparative example 10 in terms of surface roughness but, as in comparative 10, the initial running friction could not be well balanced against the post-storage rate of drop-out (DO) increase.

COMPARATIVE EXAMPLE 15

Because of no incorporation of the inorganic pigment, the endurance coefficient of friction increases with an increase in the number of tape passes. This appears to be due to a surface shape change of the back coat surface. Such a tendency is particularly true at high temperature, resulting in a wear on the back coat.

COMPARATIVE EXAMPLE 16

Only the main carbon black SB250 was used in the absence of any ordinate carbon black, and the amount of the inorganic powders TF 100 was increased. No problem arose regarding endurance friction as compared with examples 10 to 12, but both the post-storage transfer of the back coat surface and the rate of DO increase became even worse.

COMPARATIVE EXAMPLE 17

The inorganic powder was changed to Homocal D and used in an amount larger than in comparative example 16. No problems arises regarding endurance friction as in Example 16, and the surface roughness and the rate of Do increase were somewhat improved over those in comparative example 16. However, no improvement was found in the post-storage transfer of the back coat surface.

COMPARATIVE EXAMPLE 18

Inorganic powders having a primary particle diameter larger than used in comparative example 16 were used. No problem arises regarding endurance friction as in comparative example 16, but both the rate of Do increase and the post-storage transfer of the back coat surface become worse.

COMPARATIVE EXAMPLE 19

The rate of Do increase was improved over that in comparative example 16. Since the particle diameter of the inorganic pigment was smaller than that of the carbon black, however, the tape was damaged after the 100th endurance friction pass at 20° C. Furthermore, the endurance friction at high temperature tended to increase, with the damage becoming even worse.

COMPARATIVE EXAMPLE 20

Inorganic powders having a particle diameter similar to that in comparative example 18 but a Mohs hardness ½ lower than that in comparative example 18 were used. No problem arose regarding endurance friction as in comparative example 18. However, the post-storage transfer of the back coat surface became worse, and the rate of Do increase became even worse as well.

COMPARATIVE EXAMPLES 21 to 24

In comparative examples 21, 22, 23 and 24, the thermoplastic polyurethane containing no polar group, and those having —COOH, and —SO$_3$Na were used. For this reason, the dispersion of the carbon black became worse as compared with the use of the NH$_2$ group-containing thermoplastic polyurethane, and so no satisfactory surface roughness was obtained even when much time was taken for dispersion. Consequently, the transfer of the back coat surface became worse.

COMPARATIVE EXAMPLE 25

No phenoxy resin was used. The endurance friction at high temperature and damage became worse.

COMPARATIVE EXAMPLE 26

A binder consisting only of phenoxy resin was used. It was difficult to disperse the carbon black, and the transfer of the back coat surface became worse.

COMPARATIVE EXAMPLE 27

The cellulosic resin was used in place of the phenoxy resin. No grave problem arose regarding the initial characteristics. However, the magnetic layer discolored after storage with a considerable drop-out (DO) increase.

COMPARATIVE EXAMPLE 28

The vinyl chloride resin was used in place of the phenoxy resin. The endurance friction at high temperature increased probably due to the fact that this resin has a high glass transition temperature Tg, and the post-storage rate of drop-out (DO) increase became high as well.

COMPARATIVE EXAMPLE 29

The binder from which the polyisocyanate compound was removed was used. Blocking occurred after storage at high temperature, and so the tape snarled up in the deck.

As can be understood from the foregoing, the present invention can successfully provide a magnetic recording medium having a back coat layer, which ensures reduced running friction and improved wear resistance, and which is capable of maintaining the initial running performance even after long-term storage or storage at high temperature and humidity, unlikely to cause corrosive or other damage to the magnetic layer, and less susceptible to striking deterioration of the initial drop-out level or error rate.

Japanese Patent Application No. 354188/1996 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What we claim is:

1. A magnetic recording medium including a non-magnetic supporting substrate, and a magnetic layer on one surface thereof and a back coat layer on the other surface thereof, said back coat layer having a non-magnetic powder dispersed in a binder, wherein:

said back coat layer contains carbon black and an inorganic powder as said non-magnetic powder, said carbon black contains a carbon black species having an average primary particle diameter of 40 to 70 nm, said inorganic powder has an average primary particle diameter of 40 to 150 nm and Mohs hardness of at least 3, a weight ratio between said carbon black and said inorganic powder is 100:0.5 to 100:10, and said binder comprises a phenoxy resin, a thermoplastic polyurethane resin having an amino group in a molecule thereof, and a polyisocyanate compound, wherein said phenoxy resin is of the formula

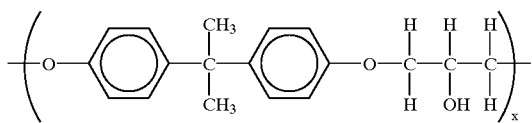

X being about 82 to 123, and the amino group in a molecular chain of said polyurethane resin is a tertiary amino group of the formula

wherein R is $C_nH_{2n+1}$, n=1 to 20 and C represents part of said molecular chain.

2. The magnetic recording medium according to claim 1, wherein said carbon black species having an average primary particle diameter of 40 to 70 nm accounts for 80 to 100% by weight of said carbon black contained in said back coat layer.

3. The magnetic recording medium according to claim 1, wherein said back coat layer contains a carbon black species having an average primary particle diameter of greater than 70 nm but equal to or smaller than 100 nm in addition to said carbon black species.

4. The magnetic recording medium according to claim 1, wherein said inorganic powder has a Mohs hardness of 3 to 6.

* * * * *